US010436382B2

(12) United States Patent
Schock et al.

(10) Patent No.: US 10,436,382 B2
(45) Date of Patent: *Oct. 8, 2019

(54) ARCHITECTURAL PANEL SUPPORT

(71) Applicant: Parasoleil, Westminster, CO (US)

(72) Inventors: Michael Edward Schock, Westminster, CO (US); Uriah Robert Bueller, Westminster, CO (US)

(73) Assignee: PARASOLEIL, Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,157

(22) Filed: Aug. 10, 2018

(65) Prior Publication Data
US 2018/0347748 A1    Dec. 6, 2018

Related U.S. Application Data

(63) Continuation of application No. 15/130,804, filed on Apr. 15, 2016, now Pat. No. 10,066,781.

(Continued)

(51) Int. Cl.
| F16M 13/02 | (2006.01) |
| E04F 13/08 | (2006.01) |
| G09F 9/00 | (2006.01) |

(52) U.S. Cl.
CPC ......... *F16M 13/02* (2013.01); *E04F 13/0817* (2013.01); *E04F 13/0837* (2013.01); *G09F 9/00* (2013.01)

(58) Field of Classification Search
CPC .. E04F 13/0817; E04F 13/0837; F16M 13/02; G09F 9/00
See application file for complete search history.

(56) References Cited

U.S. PATENT DOCUMENTS 1,494,234 A * 5/1924 Gossett ............... E04D 13/1407
285/42
3,415,554 A * 12/1968 Papayoti .................. E04G 7/24
403/187

(Continued)

OTHER PUBLICATIONS

Penn Engineering, SCF Handbook, 2013.
(Continued)

*Primary Examiner* — James M Ference
(74) *Attorney, Agent, or Firm* — Allan Watts

(57) ABSTRACT

Support brackets for supporting panels, architectural panel systems, and methods of installing architectural panels on support structures. Support brackets can include opposite sides, four quadrants, through holes containing studs extending from one side of the plate, and a center hole. Architectural panel systems can include support brackets attaching architectural panels to a support structure, first fasteners attaching the support brackets to the architectural panels, and second fasteners attaching the support brackets to the support structure. Methods of installing an architectural panel system can include attaching architectural panels to support brackets with first fasteners, positioning the support brackets on a support structure, and attaching the support brackets to the support structure with second fasteners, for example, that extend through the support brackets. Architectural panels can include interior cutouts that pass sunlight to form aesthetic patterns of sunlight and shade in an occupied space.

20 Claims, 5 Drawing Sheets

Related U.S. Application Data

(60) Provisional application No. 62/147,825, filed on Apr. 15, 2015.

(56) References Cited

U.S. PATENT DOCUMENTS

| | | | | |
|---|---|---|---|---|
| 3,837,752 | A * | 9/1974 | Shewchuk | F21V 21/06 248/158 |
| 3,963,210 | A * | 6/1976 | Macklin | E04G 21/185 249/210 |
| 4,295,308 | A * | 10/1981 | Korfanta | E04H 12/2261 248/158 |
| 4,571,905 | A * | 2/1986 | Kaminaga | E04B 2/90 52/204.591 |
| 4,644,711 | A * | 2/1987 | Eickhof | E04H 13/006 52/126.7 |
| 4,662,145 | A * | 5/1987 | Tanikawa | E04B 2/88 52/235 |
| 4,736,554 | A * | 4/1988 | Tyler | E04B 1/0007 249/93 |
| 4,793,111 | A * | 12/1988 | Shewchuk | E04H 12/08 256/59 |
| 4,996,804 | A * | 3/1991 | Naka | E04F 15/02452 52/126.1 |
| 5,048,242 | A * | 9/1991 | Cline | E04F 15/02441 52/126.6 |
| 5,067,300 | A * | 11/1991 | Takeda | E04B 2/90 52/235 |
| 5,323,577 | A * | 6/1994 | Whitmyer | E04B 2/96 52/209 |
| 5,467,569 | A * | 11/1995 | Chiodo | E04B 1/41 52/295 |
| 5,501,048 | A * | 3/1996 | Nakanishi | E04B 1/0007 52/295 |
| 5,548,939 | A * | 8/1996 | Carmical | E04B 1/4135 52/698 |
| 5,603,187 | A * | 2/1997 | Merrin | E04D 13/12 248/237 |
| 5,664,392 | A * | 9/1997 | Mucha | E04B 2/96 248/262 |
| 5,720,571 | A * | 2/1998 | Frobosilo | E04B 2/96 403/2 |
| 5,725,190 | A * | 3/1998 | Cuthbertson | F04D 25/088 248/317 |
| 5,810,303 | A * | 9/1998 | Bourassa | H02G 3/126 174/58 |
| 5,819,487 | A * | 10/1998 | Bull | E02D 27/42 52/296 |
| 5,846,018 | A * | 12/1998 | Frobosilo | E04B 2/96 403/403 |
| 6,240,682 | B1 * | 6/2001 | James | E04B 7/024 52/712 |
| 6,492,606 | B1 * | 12/2002 | MacLean | H01H 19/24 200/11 R |
| 6,584,702 | B2 * | 7/2003 | Irey | D06F 58/20 34/140 |
| 6,643,945 | B1 * | 11/2003 | Starks | E04G 21/185 248/207 |
| 6,729,080 | B1 * | 5/2004 | Zambelli | E04B 2/94 52/167.1 |
| 6,813,853 | B1 * | 11/2004 | Tucker | G09F 9/33 340/815.45 |
| 6,988,700 | B2 * | 1/2006 | Cote | E04H 12/2269 248/519 |
| 7,854,099 | B2 * | 12/2010 | Kidd | E04F 13/0803 52/235 |
| 8,061,680 | B1 * | 11/2011 | Erickson | E04G 13/00 249/210 |
| 8,424,255 | B2 * | 4/2013 | Lenox | F24J 2/5245 52/173.3 |
| 8,511,032 | B2 * | 8/2013 | Abdel-Rahman | E04B 2/88 248/228.1 |
| 8,607,515 | B2 * | 12/2013 | Jarvis | E04B 1/0038 52/253 |
| 8,683,760 | B2 * | 4/2014 | Segers | E04D 13/1407 52/173.3 |
| 8,702,048 | B2 * | 4/2014 | Kludt | F16B 2/12 248/223.41 |
| 8,827,226 | B2 * | 9/2014 | Townsend | F16M 11/10 220/3.5 |
| 8,898,991 | B2 * | 12/2014 | Cai | E04H 12/08 52/651.01 |
| 9,693,472 | B2 | 6/2017 | Dias | |
| 2003/0033764 | A1 * | 2/2003 | Ting | E04B 2/96 52/235 |
| 2003/0033765 | A1 * | 2/2003 | Ting | E04B 2/96 52/235 |
| 2003/0205016 | A1 * | 11/2003 | Gulbrandsen | E04B 9/00 52/506.06 |
| 2004/0079038 | A1 * | 4/2004 | Crooker, Jr. | E04B 2/96 52/235 |
| 2005/0049593 | A1 * | 3/2005 | Duong | A61B 17/8047 606/287 |
| 2005/0241244 | A1 * | 11/2005 | Luo | E06B 3/5427 52/92.2 |
| 2005/0284053 | A1 * | 12/2005 | Grunewald | E04B 2/96 52/235 |
| 2006/0100626 | A1 * | 5/2006 | Rathbun | A61B 17/1728 606/86 B |
| 2006/0109667 | A1 * | 5/2006 | Flaherty | F21S 8/083 362/431 |
| 2006/0149251 | A1 * | 7/2006 | Ziolo | A61B 17/7059 606/281 |
| 2006/0204348 | A1 * | 9/2006 | Shuart | F16B 37/068 411/107 |
| 2006/0248814 | A1 * | 11/2006 | Chen | E04F 15/02476 52/126.6 |
| 2007/0039258 | A1 * | 2/2007 | Walker, III | E04B 2/96 52/235 |
| 2007/0057133 | A1 * | 3/2007 | Cottingham | F16M 13/02 248/309.1 |
| 2007/0162019 | A1 * | 7/2007 | Burns | A61B 17/8047 606/281 |
| 2008/0078894 | A1 * | 4/2008 | Morrow | E04B 1/003 248/200 |
| 2008/0197246 | A1 * | 8/2008 | Belden | A47F 13/00 248/176.1 |
| 2008/0222981 | A1 * | 9/2008 | De Gobbi | E04B 1/41 52/235 |
| 2009/0272053 | A1 * | 11/2009 | Dent | E02D 27/32 52/296 |
| 2010/0085752 | A1 * | 4/2010 | Zheng | F21S 8/02 362/249.02 |
| 2010/0257812 | A1 * | 10/2010 | Schultz | E04B 2/96 52/704 |
| 2010/0278500 | A1 * | 11/2010 | Campos | G02B 6/4439 385/135 |
| 2011/0056162 | A1 * | 3/2011 | Bai | E06B 3/5427 52/698 |
| 2011/0225915 | A1 * | 9/2011 | Swartz | E04H 9/10 52/309.4 |
| 2012/0131879 | A1 * | 5/2012 | Bergman | E04F 11/1812 52/704 |
| 2012/0192495 | A1 * | 8/2012 | Coughenour, Jr. | F16B 37/044 49/464 |
| 2012/0273032 | A1 * | 11/2012 | Franklin | F24S 25/636 136/251 |
| 2013/0008121 | A1 * | 1/2013 | Dalen | E04B 1/4178 52/704 |
| 2013/0051903 | A1 * | 2/2013 | Ra | E04B 2/90 403/205 |
| 2013/0061453 | A1 * | 3/2013 | Rosendahl | E04H 5/04 29/525.11 |
| 2013/0067849 | A1 * | 3/2013 | Espinosa | E04B 1/4121 52/699 |
| 2013/0298494 | A1 * | 11/2013 | Corsi | E04B 1/40 52/705 |

(56) References Cited

U.S. PATENT DOCUMENTS

| | | | | |
|---|---|---|---|---|
| 2013/0325074 A1* | 12/2013 | Ziolo | ................ | A61B 17/7059 |
| | | | | 606/290 |
| 2014/0028069 A1* | 1/2014 | Weiss | ...................... | A47C 3/18 |
| | | | | 297/344.21 |
| 2014/0069485 A1* | 3/2014 | Rawlings | ................ | H02S 20/00 |
| | | | | 136/251 |
| 2014/0157699 A1* | 6/2014 | Moeller | ................... | E04B 2/88 |
| | | | | 52/235 |
| 2014/0208681 A1* | 7/2014 | Rice | ..................... | E04B 1/4178 |
| | | | | 52/712 |
| 2014/0260011 A1* | 9/2014 | Pettibone | ................. | E06B 7/14 |
| | | | | 52/209 |
| 2015/0076097 A1* | 3/2015 | Powers | ................... | H04Q 1/02 |
| | | | | 211/183 |
| 2015/0082719 A1* | 3/2015 | Takahashi | ................ | E04B 1/40 |
| | | | | 52/298 |
| 2015/0330669 A1* | 11/2015 | Port | ........................ | E04B 1/38 |
| | | | | 52/698 |
| 2016/0305131 A1* | 10/2016 | Schock | ................ | F16M 13/02 |

OTHER PUBLICATIONS

Captive Fastener Corp., Captive Fastener Catalog, 2006.
Captive Fastener Corp., Self-Clinching Studs Series CH, CHS & CHA, 2014.
C.R. Laurence Co., Structural Glass Curtainwall Hardware, Jan. 29, 2010.
C.R. Laurence Co., CRL Heavy-Duty Spider Fittings, Nov. 21, 2013.
References Cited for NP1 Parent U.S. Appl. No. 15/130,804, Mar. 9, 2018.

\* cited by examiner

Section A-A

ARCHITECTURAL PANEL SUPPORT

RELATED PATENT APPLICATIONS

This patent application is a continuation of, and claims priority to, patent application Ser. No. 15/130,804 filed Apr. 15, 2016, which is a non-provisional patent application of, and claims priority to U.S. provisional patent application No.: 62/147,825, filed Apr. 15, 2015, which all have the same title, inventors, and assignee. The contents of these priority patent applications are incorporated herein by reference. If there are any conflicts or inconsistencies between this patent application and the priority provisional patent application, however, this patent application governs herein.

FIELD OF THE INVENTION

Various embodiments of this invention relate to brackets and support systems for architectural panels and architectural panel systems and to methods of prefabricating and installing architectural panel systems. Particular embodiments relate to panel systems that provide shade.

BACKGROUND OF THE INVENTION

Various architectural components and systems have been developed for constructing spaces in which people live, work, meet, socialize, and eat, as examples. Numerous architectural components have shielded occupants from the elements to varying degrees and have shaded occupants from the sun among other things. Further, people have not always wanted to be completely shielded from the outside environment and architectural components have been used that allow partial passage of air, sound, light, and visibility. Further still, panels have been used as an architectural component and have been attached with fasteners to a support structure. Prior panel support systems, however, have provided installation of the panels that has not always been uniform, have required a relatively high level of skill for installation, have been complicated to install properly, or a combination thereof. Further, in the prior art, dimensional variations in the support structure have been difficult to contend with in the field and prior panel support systems have not adapted well to dimensional variations encountered during construction. This has resulted in loss of time, additional expense, and sloppy installations. Over time, architectural components and systems have been improved in many ways, but opportunities for improvement still exist in particular areas and for particular aspects of these devices.

Needs or potential for benefit or improvement exist for architectural components and systems for constructing spaces for people to occupy that define the spaces, that appropriately shield occupants from the elements, that partially or fully shade occupants from the sun, that provide aesthetic spaces, for example, in which natural lighting provides decorative patters or changes with the movement of the sun, or a combination thereof. Further, needs or potential for benefit or improvement exist for architectural components and systems that allow partial passage of air, sound, light, or visibility, that are supported by a support structure, and that partially or fully provide for a neat and regular installation of the architectural components or panels without an overly high level of skill required for installation.

Further still, needs or potential for benefit or improvement exist for architectural panel systems and methods that make installation relatively easy, that provide for ready adaptation to dimensional variations in the support structure, that are relatively quick to install, or a combination of such features. Needs or potential for benefit or improvement exist for components, systems, and methods that can be installed more readily, that are more robust, that are inexpensive, that resist the elements, that are adaptable, that are aesthetically appealing, that provide for regular spacing or dimensions, that are easy to maintain once installed, or a combination thereof, as examples. Room for improvement exists over the prior art in these and other areas that may be apparent to a person of skill in the art having studied this document.

SUMMARY OF PARTICULAR EMBODIMENTS THE INVENTION

This invention provides, among other things, support brackets for supporting panels, architectural panel systems, methods of installing an architectural panel system on a support structure, and methods of prefabricating an architectural panel system to be mounted on a support structure. Support brackets can include, for example, through holes that extend through the bracket, and various embodiments also include an e.g., elongated) center hole that (e.g., also) extends through the bracket. Architectural panel systems can include, in various embodiments, multiple architectural panels, multiple support brackets that attach the multiple architectural panels to a support structure, and various fasteners. These fasteners can include, for instance, multiple first fasteners that attach the multiple support brackets to the multiple architectural panels, and multiple second fasteners that attach the multiple support brackets to the support structure.

Methods of installing an architectural panel system can include acts of attaching multiple architectural panels to multiple support brackets, positioning the multiple support brackets on the support structure, and attaching the multiple support brackets to the support structure, for example. In a number of embodiments, for instance, the act of attaching the multiple architectural panels to the multiple support brackets is performed using multiple first fasteners. Further, in various embodiments, the act of attaching the multiple support brackets to the support structure is performed using multiple second fasteners, for example, that extend through the multiple support brackets.

In a number of embodiments, improvements to support brackets, support systems, and methods provide for architectural panel systems that are more reliable, that last longer, that are more adaptable, that can be used in conditions that are more extreme, that handle abuse well, that work better, that are easier to use, that are easier to maintain, that are less expensive to manufacture, that have a lower lifecycle cost, that offer more options for use, that can be installed more easily, more quickly, or in a larger variety of conditions, or a combination thereof, for example, in comparison with certain alternatives.

Various embodiments provide, as objects or benefits, architectural components and systems for constructing spaces for people to occupy that define the spaces, that appropriately shield occupants from the elements, that partially or fully shade occupants from the sun, that provide aesthetic spaces, or a combination thereof. In a number of embodiments, spaces are constructed in which natural lighting provides decorative patters, changes with the movement of the sun, or both. Further, various embodiments provide architectural components or systems that allow partial passage of air, sound, light, or visibility, that are supported by a support structure, and that partially or fully provide for a neat and regular installation of architectural components or panels, or a combination thereof. Still further, in a number of embodiments, systems and spaces can be constructed or panels can be installed without an overly-high level of skill required.

Further still, various embodiments provide, as objects, benefits, or improvements, components, systems, or methods that make installation of panel systems relatively easy, that provide for ready adaptation to dimensional variations in the support structure, that are relatively quick to install, or a combination of such features. In a number of embodiments, components and systems are more robust, are relatively inexpensive, resist the elements well, are adaptable, are aesthetically appealing, provide for regular spacing or dimensions, are easy to maintain once installed, or a combination thereof, as examples, in comparison with prior art alternatives. In addition, various other embodiments of the invention are also described herein, and other benefits of certain embodiments may be apparent to a person of skill in this area of technology.

Specific embodiments of the invention include, for instance, various support brackets fore supporting panels. In a number of embodiments, for example, a support bracket includes multiple through holes, multiple studs, and an (e.g., elongated) center hole. In various embodiments, for instance, the bracket includes, for example, a first side, a second side opposite the first side, and a center. Some embodiments include four quadrants. Further, in a number of embodiments, the multiple through holes extend through the bracket. Still further, in various embodiments, multiple of the four quadrants each include one of the multiple through holes. Even further, in a number of embodiments, one of the multiple studs is mounted in each of the multiple through holes, all of the multiple studs are parallel, all of the multiple studs extend from the first side of the plate, or a combination thereof. Further still, in various embodiments, the center or elongated hole extends through the bracket.

In particular embodiments, each of the four quadrants includes one of the multiple through holes, each of the four quadrants includes one of the multiple studs, or both. Still further, in some embodiments, each of the four quadrants includes a corner formed in the plate, the plate includes four edges, each of the four edges extends into two of the four quadrants, or a combination thereof. Even further, in a number of embodiments, the multiple through holes are arranged in a rectangle (e.g., a square), for example, with the multiple through holes at corners of the rectangle. In some embodiments, for instance, the rectangle has a center and the (e.g., elongated) plate hole or center hole is at the center of the rectangle.

In certain embodiments, the bracket or plate includes a first portion, a second portion, and a third portion, the second portion is separated from the first portion by a first bend in the plate, and the third portion is separated from the second portion by a second bend in the plate. In various embodiments, for example, the multiple through holes, the multiple studs, or both, are in the first portion, the elongated plate hole is in the third portion, the third portion of the plate is parallel to the first portion of the plate, or a combination thereof. Further, in some embodiments, the first portion further includes an access hole, for example, that extends through the plate, and in particular embodiments, the access hole is in line with the elongated plate hole.

Other specific embodiments of the invention include, for instance, various architectural panel systems, as another example. In a number of such embodiments, the architectural panel system includes, for instance, multiple architectural panels, multiple support brackets, multiple first fasteners, and multiple second fasteners. In various embodiments, for example, the multiple support brackets attach the multiple architectural panels to a support structure. Further, in a number of embodiments, the multiple first fasteners attach the multiple support brackets to the multiple architectural panels. Still further, in various embodiments, the multiple second fasteners attach the multiple support brackets to the support structure.

In some embodiments of architectural panel systems, the multiple support brackets each include some or all of the features of support brackets previously described. In some architectural panel systems, for example, the multiple support brackets each include a plate, for instance, that includes a first side, a second side, and four quadrants. Further, in some embodiments, the multiple support brackets each include multiple through holes, for example, extending through the plate. Still further, in some embodiments, multiple of the four quadrants each include one of the through holes. Further still, in some embodiments, the multiple support brackets each include an plate hole, for example, that extends through the plate. Even further, in some embodiments, the multiple first fasteners extend through the multiple through holes, one of the multiple second fasteners extends through the plate hole, or both.

In particular embodiments of architectural panel systems, the multiple architectural panels are each flat, the multiple architectural panels are each polygonal, or both. Further, in some embodiments, the multiple architectural panels each include multiple interior cutouts, for example, through each of the multiple architectural panels. Still further, in a number of embodiments, multiple of the multiple architectural panels are exposed to direct sunlight during at least part of multiple days during a year such that the direct sunlight passes through multiple of the multiple interior cutouts to form a pattern of sunlight and shade in an occupied space.

Moreover, some embodiments of architectural panel systems include the support structure. In particular embodiments, the support structure includes multiple substantially horizontal beams. Further, in certain embodiments of architectural panel systems, the multiple architectural panels are each attached to two of the multiple substantially horizontal beams with the multiple second fasteners, the multiple support brackets, or both. Even further, in some embodiments, the multiple architectural panels sit on top of the multiple support brackets, the multiple support brackets sit on top of the multiple substantially horizontal beams, or both. Further still, in various embodiments, the multiple architectural panels are each supported by at least four of the multiple support brackets. Still further, in a number of embodiments of architectural panel systems, a first plurality of the multiple support brackets each support two of the multiple architectural panels. Even further still, in some embodiments, the first plurality of the multiple support brackets each separate the two of the multiple architectural panels by a predetermined gap, for example, to allow for expansion and contraction of the two of the multiple architectural panels.

In some embodiments of architectural panel systems, the multiple first fasteners pass through factory-formed panel holes through the multiple architectural panels. Further, in a number of embodiments, the multiple architectural panels each include an edge cutout, for example, for each of the multiple support brackets, for instance, that attach the multiple architectural panels to the support structure. Still further, in particular embodiments of architectural panel systems, each edge cutout provides space for one of the multiple second fasteners, for example, that attach the multiple support brackets to the support structure.

Still other specific embodiments of the invention include various methods, for example, of installing an architectural panel system on a support structure. In some methods, for example, the method includes, for instance, at least acts of: attaching multiple architectural panels (e.g., to support brackets), positioning the multiple support brackets (e.g., on a support structure), and attaching the multiple support brackets (e.g., to the support structure). In a number of embodiments, the method includes attaching the multiple architectural panels to the multiple support brackets with multiple first fasteners, for example. Further, in various embodiments, the attaching of the multiple support brackets to the support structure is performed with multiple second fasteners. In a number of embodiments, for example, the multiple second fasteners extend through the multiple support brackets.

In particular embodiments of methods, for example, the act of attaching the multiple architectural panels to the multiple support brackets with the multiple first fasteners is performed before the act of positioning the multiple support brackets on the support structure. Further, in certain embodiments of methods of installing an architectural panel system on a support structure, the act of positioning the multiple support brackets on the support structure is performed before the act of attaching the multiple support brackets to the support structure with the multiple second fasteners. Still further, in some methods of installing an architectural panel system on a support structure, the act of attaching the multiple architectural panels to the multiple support brackets is performed while the multiple support brackets are resting on the support structure.

Further, in particular embodiments, the method includes, for example, an act of fabricating the multiple support brackets each with: multiple first plate holes, for example, for the multiple first fasteners to attach the multiple architectural panels to the multiple support brackets, at last one second plate hole, for instance, for at least one of the second fasteners to attach each of the multiple support brackets to the support structure, or both. Still further, some methods of installing an architectural panel system on a support structure, for example, include fabricating the multiple architectural panels with multiple panel holes, for instance, spaced for the multiple first plate holes for the multiple first fasteners to attach the multiple architectural panels to the multiple support brackets. Even further, in a number of embodiments include shipping the multiple architectural panels with the multiple panel holes and the multiple support brackets with the multiple first plate holes to an installation site. Other embodiments of the invention may be apparent to a person of ordinary skill in the art having studied this document.

Figure 1:
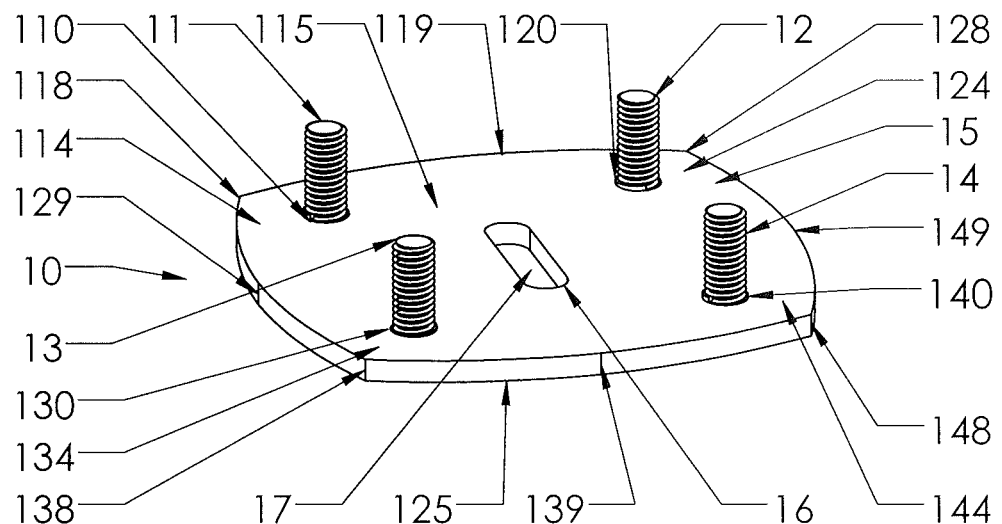
FIG. 1 is an isometric view of an example of a support bracket for supporting panels (e.g., architectural panels)

The drawings provided herewith illustrate, among other things, examples of certain aspects of particular embodiments. Other embodiments may differ. Various embodiments may include aspects shown in the drawings, described in the specification (including the claims), known in the art, or a combination thereof, as examples.

DETAILED DESCRIPTION OF EXAMPLES OF EMBODIMENTS

This patent application describes, among other things, examples of certain embodiments, and certain aspects thereof. Other embodiments may differ from the particular examples described in detail herein. Various embodiments are or concern support brackets for supporting panels, architectural panel systems, architectural panels, methods of installing an architectural panel system, for example, on a support structure, and methods of prefabricating an architectural panel system, for instance, to be mounted on a support structure. Support brackets can include, for instance, a plate containing four quadrants where multiple of the four quadrants contain a through hole that extends through the plate, an elongated plate hole, for example, that extends through the plate, or a combination thereof. Further, architectural panel systems can include, for instance, multiple architectural panels, multiple support brackets that attach the multiple architectural panels to a support structure, multiple first fasteners that attach the multiple support brackets to the multiple architectural panels, multiple second fasteners that attach the multiple support brackets to the support structure, or a combination thereof.

Still further, methods of installing an architectural panel system can include, for instance, acts of: attaching multiple architectural panels to multiple support brackets with multiple first fasteners, positioning the multiple support brackets on the support structure, and attaching the multiple support brackets to the support structure with multiple second fasteners, for example, that extend through the multiple support brackets. Even further, methods of prefabricating an architectural panel system can include, for instance, acts of fabricating multiple architectural panels, fabricating multiple support brackets, and shipping the multiple architectural panels and the multiple support brackets to the job site. In a number of embodiments, the multiple support brackets in such a method each include multiple first plate holes, for example, for multiple first fasteners to attach the multiple architectural panels to the multiple support brackets, the multiple architectural panels each include multiple panel holes spaced for the multiple first plate holes for the multiple first fasteners to attach the multiple architectural panels to the multiple support brackets, the multiple support brackets each include at least one second plate hole for at least one second fastener to attach each of the multiple support brackets to the support structure, or combination thereof.

In particular embodiments, various support brackets for supporting panels include a plate that includes four quadrants. In various embodiments, these quadrants are regions of the plate, for example, separated by imaginary perpendicular lines that pass through the center of the plate. In some embodiments (e.g., plates or brackets that have straight edges), for example, the imaginary lines that define the different quadrants are parallel to edges of the plate. In a number of embodiments, for example, one, some, or multiple of the four quadrants each include a through hole that extends through the plate. Further, in various embodiments, the support bracket further includes an elongated plate hole that (e.g., also) extends through the plate. Other embodiments may include a subset of such elements and various embodiments include additional elements as well, for example, as described herein. Still further, where elongated plate hole is described herein, other embodiments can use a hole that is not elongated, for example, that is round or that has another shape.

In some embodiments, for example, the support bracket includes a center and the (e.g., elongated) plate hole is located at the center of the support bracket. In various embodiments, this "center" is centered on the plate in two perpendicular directions. Further, in a number of embodiments, the through hole in (e.g., multiple of) the four quadrants is round. In other embodiments, the through hole(s) can be square, rectangular, polygonal (e.g., a regular polygon), pentagonal hexagonal, octagonal, splined, or threaded, as other examples. In some embodiments, the through hole(s) can be tapered stepped, or have more than one cross section. Further still, in various embodiments, each of the four quadrants includes one of the through holes, for instance, for a portion or all of the support brackets. In some embodiments, however, (e.g., for some of the support brackets) only a fraction (e.g., two) of the four quadrants include (e.g., one) of the through holes.

Still further, in certain embodiments, the support bracket further includes multiple (e.g., first) fasteners, for example, a (e.g., first) fastener mounted in each of the through holes. Moreover, in some such embodiments, the (e.g., first) fastener mounted in (e.g., each) of the through holes is a stud, or in particular embodiments, the stud mounted in (e.g., each) of the through holes is a self-clinching stud. Even further, in a number of embodiments, the fasteners (or fastener mounted in each of the through holes) are all parallel, all extend from a common side of the plate or support bracket, or both. Furthermore, in some embodiments, some (e.g., two) of the through holes may contain fasteners, and others (e.g., two) of the through holes may omit (e.g., first) fasteners.

In some embodiments, some or each of the four quadrants of the support bracket includes a corner formed in the plate. Further, in some such embodiments, the corner formed in the plate (e.g., in each of the four quadrants) is a rounded corner. In fact, in various embodiments, some or all of the corners formed in the plate are rounded corners. Still further, in a number of embodiments, one or more corners formed in the plate (e.g., in each of the four quadrants) is a right-angle corner. As used herein, a "right angle corner" has an angle between 85 and 95 degrees. Even further, in various embodiments, the plate includes four edges. In a number of embodiments, at least a portion or a majority of the length of these edges are straight, and the angle of the corners of the plate are the angles between these straight portions of the edges. In other embodiments, the edges of the plate are curved. Moreover, in certain embodiments, the plate is oval shaped or round and has essentially just one continuous edge. Furthermore, in some embodiments, the plate can have 2, three, or more than four edges, as other examples.

Further still, in a number of embodiments, each of the (e.g., four) edges extends into two (e.g., of the four) quadrants. Even further still, in some embodiments, the elongated plate hole has a major axis (e.g., parallel to the plane of the plate and parallel to the longest dimension of the elongated plate hole) and the major axis of the elongated plate hole, in a number of embodiments, is parallel to one or more (e.g., two) of the (e.g., four) edges of the plate. As used herein, unless stated otherwise, "parallel" means parallel to within 10 degrees, and "substantially parallel" means parallel to within 20 degrees. Further, wherever certain embodiments are described herein wherein two components or portions of a component are "parallel", other embodiments are contemplated wherein those same components or portions of a component are "substantially parallel".

In a number of embodiments, the plate of the support bracket is flat (e.g., has a uniform thickness and contains no bends). In other embodiments, the plate has one or more bends, for example, two bends. Further, in various embodiments the plate is metal, for example, steel, stainless steel, aluminum, or copper, the plate is powder coated, or a combination thereof. Even further, in various embodiments, the plate has a thickness between $1/16$ and $1/4$ inch, the plate has a thickness between $3/32$ and $5/32$ inch, or the plate has a thickness of $1/8$ inch (e.g., nominal thickness), as examples. Further still, in a number of embodiments, the plate is polygonal, the plate is a quadrilateral, the plate is rectangular, or the plate is square, as examples. Still further, in a number of embodiments (e.g., of such embodiments), the plate has rounded corners, rounded sides, or both.

Even further still, in some embodiments, the through holes in the plate or support bracket are arranged in a rectangle, for instance, with the through holes at corners of the rectangle. In certain embodiments, for example, this rectangle is a square. Moreover, in particular embodiments, such a rectangle or square has a center (e.g., where diagonal lines between opposite corners intersect) and the elongated plate hole is at the center of the rectangle. Further yet, in some embodiments, the rectangle formed by the through holes is concentric with or centered within (or both) the rectangle formed by the edges of the plate. Furthermore, in a number of embodiments, the through holes, first fasteners, or studs, are arranged in a circle, for example, having a center at the center of the plate. In some embodiments, the through holes, first fasteners, or studs, are equally spaced around this circle. Other embodiments, however, may differ.

Further, in particular embodiments, an architectural panel system includes multiple architectural panels, multiple support brackets, (e.g., that attach the multiple architectural panels to a support structure), multiple first fasteners (e.g., that attach the multiple support brackets to the multiple architectural panels), and multiple second fasteners (e.g., that attach the multiple support brackets to the support structure). Other embodiments (e.g., of architectural panel systems) may include a subset of such elements and limitations and various embodiments include additional elements and/or limitations as well, for example, as described herein. In some embodiments, for example, some or all of the multiple support brackets of the architectural panel system are as described herein or contain one or more of the features, elements, or limitations described herein. Further, in particular embodiments, for example, each of the multiple second fasteners extends through the elongated plate hole that extends through the plate.

Still further, in various embodiments, the multiple architectural panels are each flat, the multiple architectural panels are each polygonal, the multiple architectural panels are each a quadrilateral, or a combination thereof. Even further, in particular embodiments, some or all of the multiple architectural panels are rectangular, a plurality of the multiple architectural panels are each an isosceles trapezoid, a plurality of the multiple architectural panels are each a triangle or an isosceles triangle, or a combination thereof. Moreover, in various of these embodiments, and in other embodiments, some or all of the multiple architectural panels have rounded corners. In other embodiments, however, some or all of the multiple architectural panels have non-rounded or square corners or corners with a cutout, for example, to provide access for the second fasteners. Further still, in some embodiments, the multiple architectural panels are metal (e.g., steel, stainless steel, aluminum, or copper), are wood, are coated, are powder coated, or a combination thereof.

In particular embodiments, for example, the multiple architectural panels (e.g., each) include (e.g., multiple, interior, or both) cutouts, for instance, through the panels. In a number of embodiments, for instance, the (e.g., multiple) cutouts are laser cut, for example, through each of the multiple architectural panels. Further, in various embodiments, the architectural panel system is constructed and positioned (i.e., when installed) so that multiple of the multiple architectural panels are exposed to direct sunlight, for example, during at least part of multiple days during a year, for instance, such that the direct sunlight passes through some or all (e.g., multiple) of the (e.g., interior) cutouts. In some embodiments, for example, the architectural panel system is constructed and positioned to form a pattern of sunlight and shade, for example, in an occupied space (e.g., opposite the sun, the space being opposite the sun from the multiple of the multiple architectural panels). In some embodiments, for instance, the cutouts are in the shape of leaves, for example, or the outline of leaves. In other embodiments, the cutouts have a different shape.

In certain embodiments, for instance, the multiple architectural panels are each mounted substantially horizontally. As used herein "substantially horizontally" or "substantially horizontal" means horizontal to within 45 degrees. In embodiments described herein where beams are described as being substantially horizontal, embodiments are contemplated wherein the beams are horizontal to within 40, 30, 25, 20, 15, 12, 10, 8, 6, 5, 4, 3, 2, or 1 degrees, as further examples. In a number of embodiments, for example, the multiple architectural panels are (e.g., each) mounted over an (e.g., exterior) occupied space. In other embodiments, besides horizontal mounting, panels can be mounted vertically, as another example, for instance, to separate (e.g., exterior or interior) occupied spaces, to provide a shield, or to clad, decorate, or shade a building, as examples. As used herein, mounting vertically means vertical to within 10 degrees. Further, where panels are described herein as being mounted vertically, embodiments are contemplated wherein the panels are vertical to within 30, 25, 20, 15, 12, 8, 6, 5, 4, 3, 2, or 1 degrees, as further examples. In other installations, panels can be mounted at other angles.

In some embodiments, the architectural panel system includes the support structure, while in other embodiments, the support structure may be supplied separately or by others. In either case, in some embodiments, the support structure includes multiple substantially horizontal beams, which may be metal (e.g., tubular) or wood beams, in different embodiments, as examples. Further, in certain embodiments, some or all of the architectural panels are each attached to two (or at least two) of the substantially horizontal beams, for example, with the second fasteners that attach the support brackets to the support structure. In particular embodiments, for example, the architectural panels are (e.g., each) attached with the support brackets, the first fasteners, and the second fasteners, for instance, to two of the substantially horizontal beams. In other embodiments, the architectural panels are attached to more than two beams, for example, 3, 4, 5, 6, 7, 8, 10, or 12 beams, as other examples.

In various embodiments, the multiple architectural panels sit on top of the multiple substantially horizontal beams. Further, in some embodiments, the architectural panels sit on top of the support brackets, for example, that sit on top of the substantially horizontal beams. Still further, in a number of embodiments, the multiple architectural panels are each supported (e.g., when installation is complete) by at least four of the multiple support brackets. Even further, in some embodiments, the architectural panels are each supported by at least six of the support brackets or by at least eight of the support brackets, as other examples. Further still, in particular embodiments, the architectural panels are each supported by precisely four of the support brackets, by precisely six of the support brackets, or by precisely eight of the multiple support brackets, as examples. For instance, in some embodiments, 4-foot by 5-foot panels are supported by four support brackets. Further, in some embodiments, 4-foot by 8-foot panels are supported by six support brackets. In other embodiments, however, the multiple architectural panels are each supported by at least or precisely 5, 7, 9, 10, 11, 12, 13, 14, 15, 16, 17, 18, 19 or 20 of the support brackets, as other examples.

Moreover, in a number of embodiments, a first plurality of the multiple support brackets of the architectural panel system each support two of the multiple architectural panels (e.g., on opposite sides of each such support bracket). Further, in some such embodiments, the first plurality of the multiple support brackets each separate the two of the multiple architectural panels by a (e.g., predetermined, uniform, or both) gap, for instance, to allow for expansion and contraction, for example, of the architectural panels. Still further, in some embodiments, the first plurality of the multiple support brackets each separate the two of the multiple architectural panels by a gap to allow for installation flexibility. In various embodiments, the gap can be for example, ⅛ inch. In different embodiments, the gap can be less than 2 inches, less than one inch, less than ¾ inch, less than ½ inch, less than ¼ inch, less than 3/16 inch, more than 1/16 inch, or a combination thereof. Even further, in some embodiments, a second plurality of the multiple support brackets each support only one of the multiple architectural panels, for example, at an edge of a set of contiguous architectural panels. In some embodiments, these second plurality of the multiple support brackets each have only two of the first fasteners, for example.

In various embodiments of an architectural panel system, the multiple first fasteners, for instance, that attach the multiple support brackets to the multiple architectural panels are studs, for example, mounted in the multiple support brackets that attach the multiple architectural panels to the support structure. Further, in a number of embodiments, the multiple first fasteners pass through factory-formed panel holes through the multiple architectural panels. Still further, in particular embodiments, these factory-formed panel holes through the multiple architectural panels are (e.g., multiple) elongated panel holes, for instance, through the multiple architectural panels. Even further, in certain embodiments, for example, each of the multiple support brackets includes an elongated plate hole, for example, that extends through the support bracket, and (e.g., one) of the multiple second fasteners passes through (e.g., each) support bracket through each elongated plate hole. Moreover, in a number of embodiments, each elongated plate hole has a major plate hole axis, each elongated panel hole has a major panel hole axis, and for each of the multiple support brackets, when the architectural panel system is assembled, the major plate hole axis is substantially perpendicular to the (e.g., each) major panel hole axis at that support bracket. In other embodiments, however, the panel holes are not elongated, for example, are round. In some embodiments, using a non-elongated or round panel hole that is factory formed (e.g., drilled), with support brackets that each support and position multiple panels, maintains a more even gap between panels once the panels are installed at the job site. Such an even gap can provide a more uniform appearance while simplifying installation in many applications.

Further, in some embodiments of an architectural panel system, the multiple architectural panels each include an edge cutout, for example, for each of the multiple support brackets that attach the architectural panels to the support structure. In a number of such embodiments, for example, each edge cutout provides space for (e.g., to install) one of the multiple second fasteners that attach the support brackets to the support structure (e.g., through the plate hole, elongated hole, or center hole in the support bracket). In various embodiments, the edge cutout (e.g., for each of the support brackets) is curved. Further, in a number of embodiments, an edge cutout projects into an otherwise straight edge or straight portion of an edge of the panel. In certain embodiments, the edge cutout for each of the multiple support brackets is curved over an angle of less than 180 degrees, less than 135 degrees, more than 45 degrees, more than 60 degrees, or a combination thereof. In particular embodiments, the edge cutout extends to or past the first fasteners. Moreover, in some embodiments, the edge cutout extends to or past the panel holes for the first fasteners. Further, in certain embodiments, the edge cutout extends from one side of the plate to an opposite (e.g., parallel) side of the plate.

In various embodiments, for example, of an architectural panel system, the multiple first fasteners each include a nut, which can be a hex nut, a self-locking nut, or an acorn nut, as examples. In some embodiments, the nut is stainless steel, for instance. In a number of embodiments, for example, each of the multiple first fasteners attaches with the nut to one of the multiple architectural panels. Further, in some embodiments, the multiple first fasteners each include a (e.g., polymer, elastomeric, rubber, or foam, for example, neoprene) washer, for instance, contacting one of the multiple architectural panels. In some embodiment such a washer is used on each side of the panel (e.g., two washers per first fastener). Still further, in some embodiments, a metal (e.g., stainless steel) washer is used between the nut and the non-metal washer. Further still, in some embodiments, the multiple second fasteners that attach the multiple support brackets to the support structure are each self drilling screws such as self drilling machine screws. In a number of embodiments, the second fasteners each drill are attachment hole in the support structure and thread into the attachment hole to attach the multiple support brackets to the support structure, for example, in a single operation using a power driving tool. Using self drilling second fasteners can reduce installation time.

Various embodiments are or include certain architectural panels, for example, that each includes a plate. In various embodiments, the plate includes, for example, a first side and a second side opposite the first side. In a number of embodiments, for instance, the second side is parallel to the first side. Further, various embodiments include at least one edge (i.e., of the plate), for example, extending from the first side to the second side. A number of embodiments further include multiple panel holes, for example, extending through the plate from the first side to the second side. In a number of embodiments, the multiple panel holes are used, for instance, for attaching the panel to multiple support brackets, for example, with multiple first fasteners. Still further, a number of embodiments of architectural panels include an edge cutout, for example, for each of the multiple support brackets. In various embodiments, the edge cutout is cut into the edge of the plate, the edge cutout provides access for a second fastener, or both, for example, for each of the multiple support brackets that attaches one of the multiple support brackets to a support structure. In a number of embodiments this access allows for installation of the second fastener. Even further, in various embodiments, this access provides for access to install the second fastener, for instance, with a socket or power tool such as an electric drill (e.g., battery powered).

In some embodiments, for each of the multiple support brackets, for example, there are two of the multiple panel holes extending through the panel. In a number of embodiments, for instance, the two of the multiple panel holes extending through the panel are spaced to align with two studs on one of the multiple support brackets. Further, in particular embodiments, for each of the multiple support brackets, there are two of the multiple panel holes extending through the panel, one edge cutout, for example, located between the two of the multiple panel holes, or both. Still further, in certain embodiments, the first side and the second side of the plate are flat, the at least one edge of the plate forms a polygon (e.g., ignoring any edge cutouts), or both. Even further, in some embodiments, the plate further includes, for instance, multiple interior cutouts. In a number of embodiments, for example, the multiple interior cutouts extend from the first side to the second side of the panel or plate, the multiple interior cutouts do not extend to the at least one edge of the plate, or both. Further still, in various embodiments, when the panel or plate is exposed to direct sunlight, the direct sunlight passes through multiple of the multiple interior cutouts to form a pattern of sunlight and shade, for example, in an occupied space.

Further embodiments include various methods, for example, of installing an architectural panel system on a support structure. In a number of embodiments, for instance, a method of installing an architectural panel system on a support structure includes at least the acts of attaching multiple architectural panels to multiple support brackets with multiple first fasteners, positioning the multiple support brackets on the support structure, and attaching the multiple support brackets to the support structure with multiple second fasteners. In a number of such embodiments, for example, the multiple second fasteners extend through the multiple support brackets. Other embodiments may include a subset of such elements or acts and various embodiments include additional elements or acts as well, for example, as described herein.

In some embodiments, the acts recited in a method are performed in the order recited herein, but in other embodiments, the acts may be performed in a different order. In a number of embodiments, unless stated otherwise, some or all acts may be performed at the same time or may overlap, as examples. Further, in some embodiments, the act of attaching the multiple architectural panels to the multiple support brackets is performed on the support structure, for example, while the multiple support brackets are resting on the support structure, while the multiple architectural panels are supported by the support structure, or both. Still further, in some embodiments, the act of positioning the multiple support brackets includes moving the multiple architectural panels and moving the multiple support brackets (e.g., as a unit or assembly), for instance, after the act of attaching the multiple architectural panels to the multiple support brackets. Even further, in certain embodiments, the act of positioning the multiple support brackets includes moving the multiple support brackets to align holes (e.g., plate holes, elongated plate holes, or center holes) in the multiple support brackets with the support structure (e.g., beams).

In a number of embodiments, the (e.g., first) holes in the multiple support brackets that are used for attachment to the support structure are elongated. Further, in some embodiments, the method further includes an act of drilling (e.g., second) holes, for example, through the multiple support brackets, into the support structure, or both, for instance, for the multiple second fasteners. Still further, in particular embodiments, the second holes in the support structure are drilled through the first holes in the multiple support brackets. Even further, in certain embodiments, the act of drilling the second holes (e.g., through the multiple support brackets into the support structure for the multiple second fasteners) is performed after the act of attaching the multiple architectural panels to the multiple support brackets (e.g., with the multiple first fasteners). Further still, in a number of embodiments, the act of drilling the second holes (e.g., through the multiple support brackets into the support structure for the multiple second fasteners) is performed before the act of attaching the multiple support brackets to the support structure (e.g., with the multiple second fasteners).

Even further still, in some embodiments, the act of drilling the second holes (e.g., through the multiple support brackets into the support structure for the multiple second fasteners) is performed concurrently with the act of attaching the multiple support brackets to the support structure with the multiple second fasteners. In particular embodiments, for example, the act of drilling the second holes through the multiple support brackets into the support structure for the multiple second fasteners and the act of attaching the multiple support brackets to the support structure with the multiple second fasteners are both performed in a single action using a self drilling screw (e.g., a self drilling machine screw). Furthermore, in various embodiments, the act of drilling the second holes through the multiple support brackets into the support structure for the multiple second fasteners is performed after the act of positioning the multiple support brackets on the support structure.

In some embodiments, the method includes an act of erecting the support structure. Further, in a number of embodiments, the act of erecting the support structure is performed before the act of attaching the multiple support brackets to the support structure (e.g., with the multiple second fasteners). Still further, in various embodiments, the act of erecting the support structure is performed before the act of positioning the multiple support brackets on the support structure. Even further, in some embodiments, the act of erecting the support structure is performed before the act of attaching the multiple architectural panels to the multiple support brackets, for example, with the multiple first fasteners. In various embodiments, particular methods can include acts of obtaining or providing, as examples, particular features, components, or aspects described herein. Further still, in various methods, the (e.g., multiple) support brackets have one or more other features described herein. Even further still, in some methods, the architectural panel system has one or more other features of panel systems described herein. Other embodiments, however, can differ.

Even further embodiments include various methods, for example, of prefabricating an architectural panel system. In a number of embodiments, for example, a method of prefabricating an architectural panel system, for instance, to be mounted on a support structure, includes at least the acts of: fabricating multiple architectural panels, fabricating multiple support brackets, and shipping the multiple architectural panels and the multiple support brackets to the job site (e.g., where the architectural panel system is to be installed). In various such embodiments, the multiple support brackets each include multiple first plate holes (e.g., through holes) for multiple first fasteners to attach the multiple architectural panels to the multiple support brackets, the multiple architectural panels each include multiple panel holes (e.g., spaced for the multiple first plate holes) for the multiple first fasteners to attach the multiple architectural panels to the multiple support brackets, and the multiple support brackets each include at least one second plate hole (e.g., elongated plate hole), for example, for at least one second fastener to attach (e.g., each of) the multiple support brackets to the support structure. Other embodiments may include a subset of such elements or acts and various embodiments include additional elements or acts as well, for example, as described herein.

In some embodiments or methods, for example, the (e.g., at least one) second plate hole in each of the support brackets is elongated. In other embodiments or methods, however, the (e.g., at least one) second plate hole in each of the support brackets is not elongated or is round, as other examples. Further, in various methods for prefabricating an architectural panel system, the (e.g., multiple) panel holes in each of the multiple architectural panels are elongated. On the other hand in a number of embodiments of methods for prefabricating an architectural panel system, the (e.g., multiple) panel holes in each of the multiple architectural panels are not elongated, for example, are round. Still further, in some embodiments, the multiple support brackets are fully or partially as described herein or include one or more other features described herein for support brackets. Even further, in some embodiments for prefabricating an architectural panel system, the architectural panel system is as described herein or includes one or more features described herein for an architectural panel system. Other embodiments, however, may differ.

Figure 2:
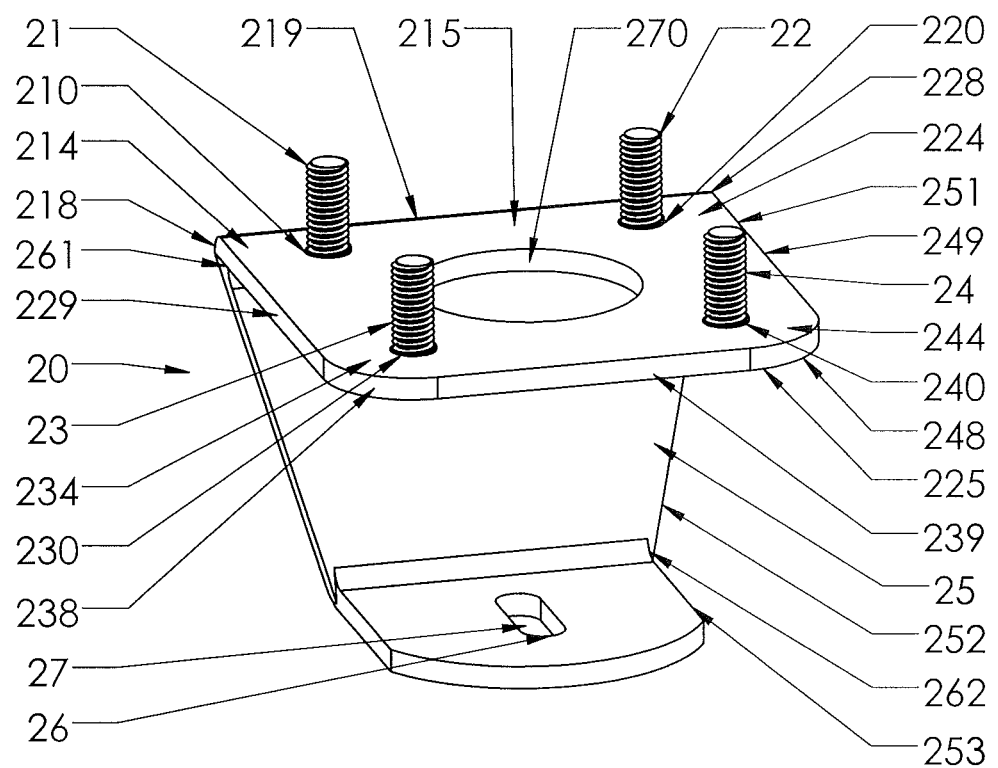
FIG. 2 is an isometric view of another example of a support bracket for supporting panels, a standoff bracket, this embodiment having three portions of plate separated by two bends in the plate.

Turning now to the drawings, FIGS. 1 and 2 illustrate two examples of support brackets, 10 and 20, respectively, for supporting panels (e.g., architectural panels). Each of support brackets 10 and 20, in the embodiments illustrated, include, a plate (e.g., 15 and 25, respectively), multiple through holes (e.g., 110, 120, 130, and 140 in support bracket 10 and 210, 220, 230, and 240 in support bracket 20), multiple first fasteners or studs (e.g., 11, 12, 13, and 14 in support bracket 10 and 21, 22, 23, and 24 in support bracket 20), and an elongated plate hole (e.g., 16 and 26, respectively). In the embodiments depicted, each plate (e.g., 15 and 25) includes a first side (e.g., 115 and 215), a second side (e.g., 125 and 225) opposite the first side, and four quadrants (e.g., 114, 124, 134, and 144 in support bracket 10 and 214, 224, 234, and 244 in support bracket 20).

Further, in the embodiments shown, the multiple through holes (e.g., 110, 120, 130, and 140 in support bracket 10 and 210, 220, 230, and 240 in support bracket 20) extend through the plate (e.g., 15 and 25, respectively), from the first side (e.g., 115 and 215) to the second side (e.g., 125 and 225). Still further, in the embodiments shown, multiple (i.e., each or all four, in these particular embodiments) of the four quadrants (e.g., 114, 124, 134, and 144 in support bracket 10 and 214, 224, 234, and 244 in support bracket 20) each include one of the multiple through holes (e.g., 110, 120, 130, and 140 in support bracket 10 and 210, 220, 230, and 240 in support bracket 20). Even further, in the embodiments illustrated, one of the multiple studs (e.g., 11, 12, 13, and 14 in support bracket 10 and 21, 22, 23, and 24 in support bracket 20), is mounted in each of the multiple through holes (e.g., 110, 120, 130, and 140 in support bracket 10 and 210, 220, 230, and 240 in support bracket 20).

In some embodiments, each of the four quadrants includes one of the multiple through holes, each of the four quadrants includes one of the multiple studs, or both. FIGS. 1 and 2 illustrate two such examples. Other embodiments, however, may differ. Some embodiments of support brackets, for example, can have just two through holes, just two first fasteners (e.g., studs), or both. Brackets 52, 54, 55, 56, and 58, shown in FIG. 5 and described in more detail below are examples. In some such embodiments, for example, two quadrants that have a common side contain the two through holes, two first fasteners (e.g., studs), or both. Some embodiments of support brackets, for another example, can have just one through hole, just one first fastener (e.g., stud), or both, for example, in just one of the quadrants. Brackets 53 and 57 shown in FIG. 5 and described in more detail below are examples. In various embodiments having more than one first fastener (e.g., stud), the first fasteners (e.g., studs) are parallel, extend from the same side of the plate, or both. Further still, in the embodiments shown in FIGS. 1 and 2, all of the multiple studs (e.g., 11, 12, 13, and 14 in support bracket 10 and 21, 22, 23, and 24 in support bracket 20), are parallel, and all of the multiple studs extend from the first side (e.g., 115 and 215), of the plate (e.g., 15 and 25).

In the embodiments of support brackets 10 and 20 illustrated in FIGS. 1 and 2, the elongated plate holes (e.g., 16 and 26, respectively) extend through the corresponding plate (e.g., 15 and 25, respectively) from the first side (e.g., 115 and 215) to the second side (e.g., 125 and 225). Further, in the embodiment shown, support brackets 10 and 20 each include a center (e.g., 17 and 27 respectively), and the elongated plate hole (e.g., 16 and 26) is located, in each embodiment, at the center (e.g., 17 and 27) of the support bracket (e.g., 10 and 20). In various embodiments, including the embodiment illustrated, the elongated plate hole (e.g., 16 or 26) is centered within a circle formed by the multiple studs (e.g., 11, 12, 13, and 14 in support bracket 10 and 21, 22, 23, and 24 in support bracket 20), or though holes (e.g., 110, 120, 130, and 140 in support bracket 10 and 210, 220, 230, and 240 in support bracket 20).

Still further, in the embodiments shown, each of the four quadrants (e.g., 114, 124, 134, and 144 in support bracket 10 and 214, 224, 234, and 244 in support bracket 20) includes a corner (e.g., 118, 128, 138, and 148 in support bracket 10 and 218, 228, 238, and 248 in support bracket 20) formed in the plate (e.g., 15 and 25 respectively). Moreover, in the embodiment shown in FIG. 1, each of the four corners (e.g., 118, 128, 138, and 148) in support bracket 10 is a non-rounded or relatively sharp corner. As used herein, a "relatively sharp corner" has a radius of curvature of $1/16^{th}$ of an inch or less. In contrast, in the embodiment shown in FIG. 2, each of the four corners (e.g., 218, 228, 238, and 248) in support bracket 20 is a rounded corner. As used herein, a "rounded corner" has a radius of curvature of more than $1/16^{th}$ of an inch.

Also in the embodiments illustrated in FIGS. 1 and 2, the plate (e.g., 15 or 25, respectively) includes four edges (e.g., 119, 129, 139, and 149 in support bracket 10 and 219, 229, 239, and 249 in support bracket 20) and each of the four edges extends into two of the four quadrants (e.g., 114, 124, 134, and 144 in support bracket 10 and 214, 224, 234, and 244 in support bracket 20). In the embodiment illustrated in FIG. 1, each of the four edges (e.g., 119, 129, 139, and 149 in support bracket 10) extends from first side 115 to second side 125. In the embodiment illustrated in FIG. 2, however, three of the four edges (e.g., 229, 239, and 249 in support bracket 20) extend from first side 215 to second side 225. In the embodiment shown in FIG. 2, edge 219 is formed by bend 261. Even further, in the embodiment shown in FIG. 1, each of the four edges (e.g., 119, 129, 139, and 149) of support bracket 10 are curved (e.g., convex outward). In contrast, in the embodiment shown in FIG. 2, each of the four edges (e.g., 219, 229, 239, and 249) in support bracket 20 are straight. Further still, in the embodiment illustrated, the multiple through holes (e.g., 110, 120, 130, and 140 in support bracket 10 and 210, 220, 230, and 240 in support bracket 20) are arranged in a rectangle, with the multiple through holes at (i.e., centered at) corners of this rectangle. Even further still, in these embodiments, the rectangle has a center (e.g., at center 17 and 27, respectively) and the elongated plate hole (e.g., 16 and 26, respectively), in each of these two embodiments, is at the center of the rectangle. Further, in a number of embodiments, such a rectangle is a square.

In the embodiment of bracket 20 shown in FIG. 2, plate 25 includes first portion 251, second portion 252, and third portion 253. In this embodiment, second portion 252 is separated from first portion 251 by first bend 261 in plate 25, and third portion 253 is separated from second portion 252 by second bend 262 in plate 25. In this particular embodiment, multiple through holes 210, 220, 230, and 240 are located in first portion 251. In addition, in this embodiment, multiple studs 21, 22, 23, and 24 are in first portion 251, extending through multiple through holes 210, 220, 230, and 240, respectively. Furthermore, in this particular embodiment, elongated plate hole 26 is in third portion 253. Moreover, in this embodiment, third portion 253 of plate 25 is parallel to first portion 251 of plate 25. In this embodiment, angles formed by bends 261 and 262 sum to 180 degrees. Further, in the embodiment depicted, first portion 251 further includes access hole 270, that extends through plate 25. In this embodiment, access hole 270 is in line with elongated plate hole 26. Further still, in this embodiment, access hole 270 is in line with and concentric with center 27 of bracket 20. In this embodiment, center 27 is a line (e.g., a centerline) that is parallel to studs 21, 22, 23, and 24, and that is perpendicular to both first portion 251 and third portion 253. In the embodiment shown, access hole 270 allows access to a second fastener that attaches support bracket 20 to the support structure through elongated hole 28. In a number of embodiments, access hole 270 provides space for a tool, such as a socket or driver, for installation of the second fastener, as well as providing space for the second fastener to pass through.

Figure 3:
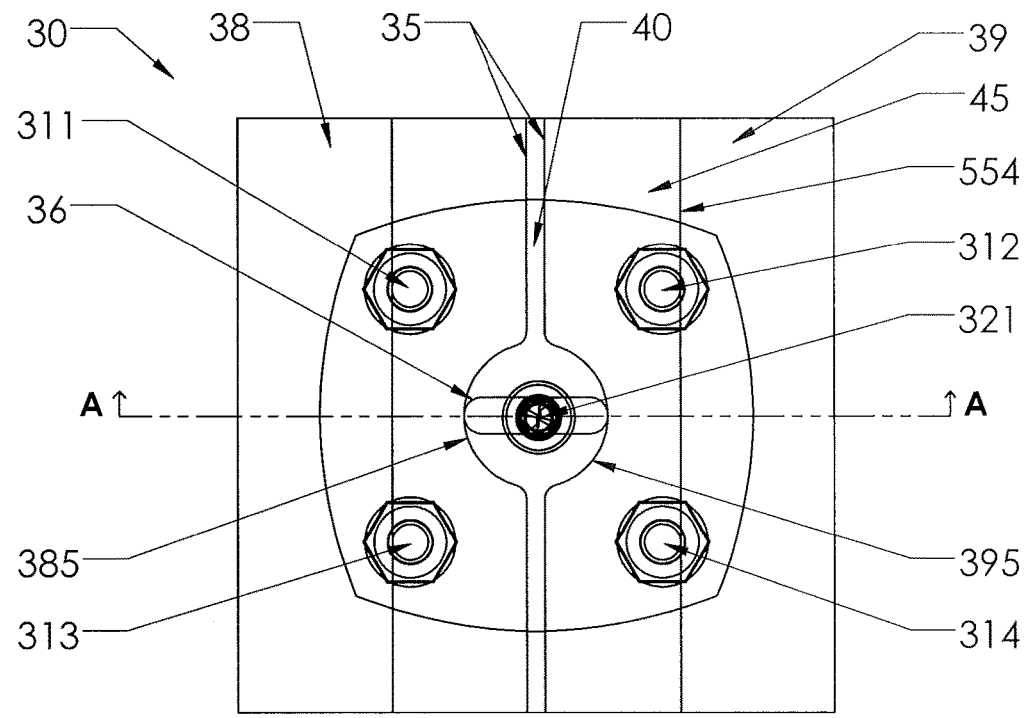
FIG. 3 is a detail top view of a portion of an example of an architectural system illustrating a connection of architectural panels to a support bracket for supporting those panels.
Figure 4:
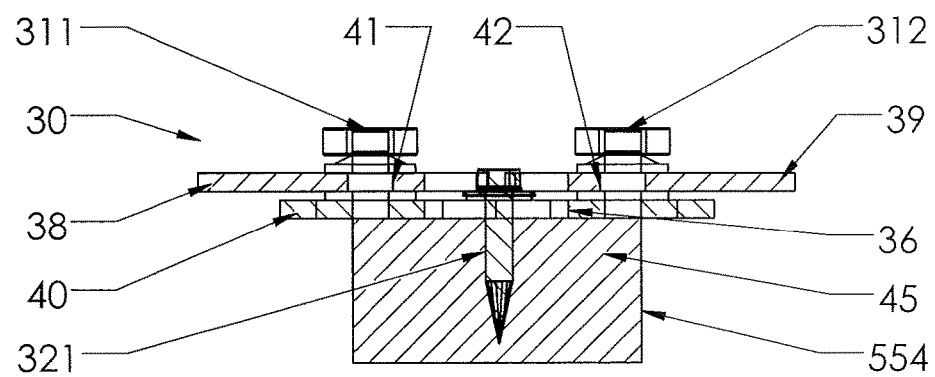
FIG. 4 is a cross sectional side view of the portion of the architectural system shown in FIG. 3, taken along section A-A, illustrating the connection of the architectural panels to the support bracket and a connection of the support bracket to a beam of a support structure.
Figure 5:
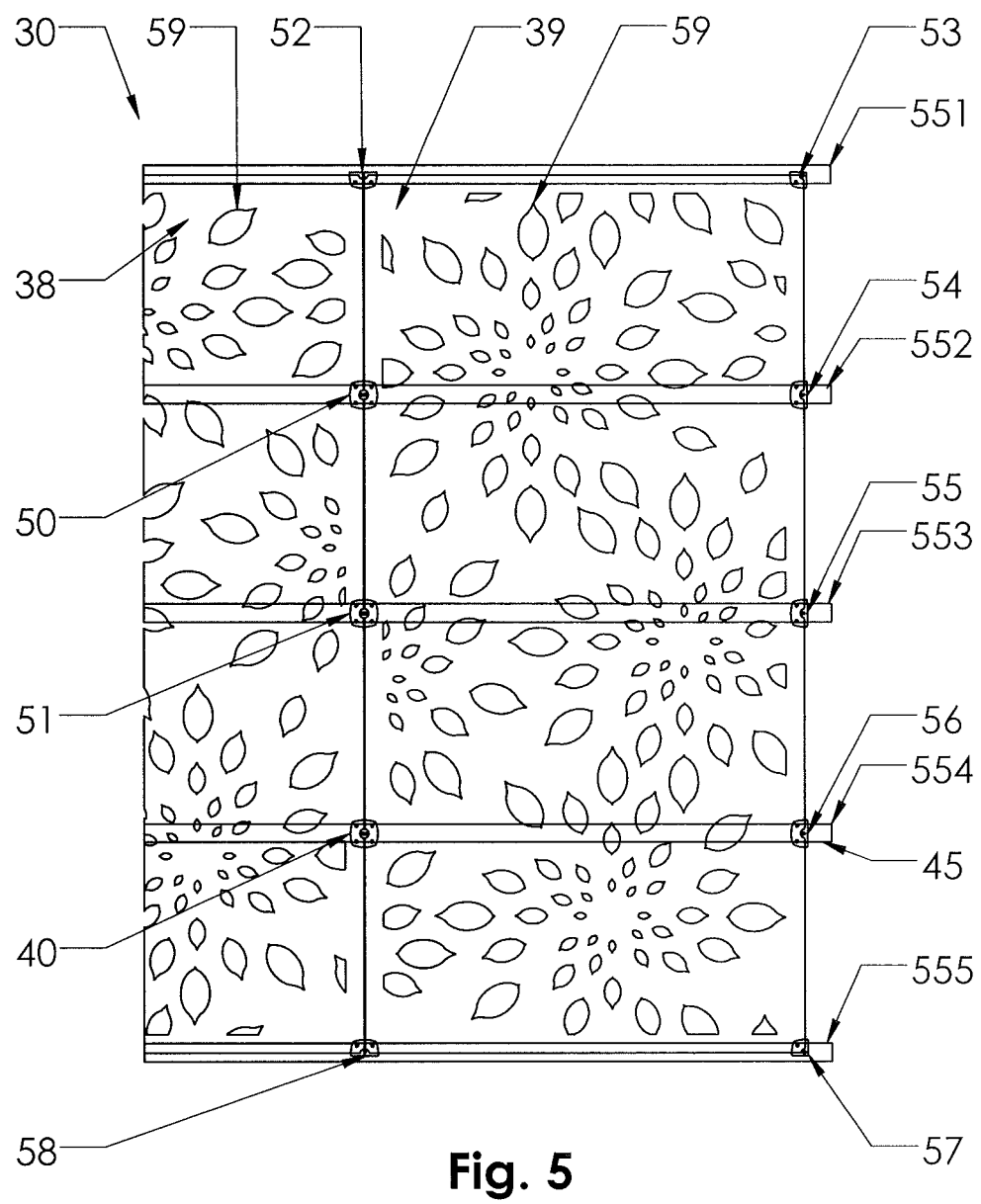
FIG. 5 is a top view of the example of an architectural system shown in FIGS. 3 and 4, showing the architectural panels and multiple support brackets supporting those panels, wherein the architectural panels have interior cutouts that can pass sunlight to form a pattern of sunlight and shade (e.g., in an occupied space beneath the panels)

Other embodiment include, for instance, various architectural panel systems. FIGS. 3 to 5 illustrate, for example, architectural panel system 30. Architectural panel system 30 includes, for instance, multiple, architectural panels (e.g., 38 and 39 shown), multiple support brackets (e.g., 40 shown in FIGS. 3-5 and 50-58 shown in FIG. 5), multiple first fasteners (e.g., studs, for example, 311, 312, 313, and 314 shown in FIGS. 3 and 4 for support bracket 40), and multiple second fasteners (e.g., screws, for instance, 321 shown in FIGS. 3 and 4 for support bracket 40). It should be understood that in FIGS. 3 and 4, only part of panels 38 and 39 are shown, and in FIG. 5, only part of panel 38 and the underlying support structure 45 are shown. Further, in FIGS. 3 and 5, the outlines of the brackets are shown, but it should be understood that these brackets are actually behind (i.e., under) the panels in these views. Similarly, in FIG. 5, beams 551, 552, 553, 554, and 555 are shown through the panels, but it should be understood that these beams of the support structure 45 are actually behind (i.e., under) the panels and brackets in these views.

In different embodiments, different size architectural panels can be used, for example, 4 by 5 foot rectangular panels. In the embodiment illustrated, support brackets 50 and 51 shown in FIG. 5 can be the same as support bracket 40 shown in more detail in FIGS. 3 and 4. In this particular embodiment, support brackets 52, 54, 55, 56, and 58 can be similar to support bracket 40 except each can have only two first fasteners (e.g., similar or identical to first fasteners 311 to 314 shown in FIGS. 3 and 4). Support brackets 53 and 57 at corners of contiguous architectural panels have only one first fastener each in the embodiment shown. Other embodiments may differ. Support brackets 52-58 can each have the same number of through holes for the first fasteners as the number of first fasteners for that bracket, for example. In other embodiments, however, all support brackets, including at the edge or corner of the contiguous panels, can be the same, for example, with four first fasteners, four through holes for the first fasteners, or both, as other examples.

In the embodiment of architectural panel system 30 depicted, the multiple first fasteners (e.g., 311, 312, 313, and 314 shown in FIGS. 3 and 4 for support bracket 40) can be identical or (e.g., at least) interchangeable. Further, in the particular embodiment illustrated, support brackets 53 and 57 are similar to support bracket 40 except each have only one first fastener (e.g., similar or identical to first fasteners 311 to 314 shown in FIGS. 3 and 4). In a number of embodiments, each of the support brackets (e.g., 40 and 50-58) include multiple through holes (e.g., similar or identical to holes 110, 120, 130, and 140 in support bracket 10 and 210, 220, 230, and 240 in support bracket 20 shown in FIGS. 1 and 2), for example, one through hole for each of the (e.g., multiple) studs (e.g., 11, 12, 13, and 14 in support bracket 10 and 21, 22, 23, and 24 in support bracket 20, or 311, 312, 313, and 314 in bracket 40). Support brackets 52, 54, 55, 56, and 58 can be similar to support bracket 40 except each have only two through holes and support brackets 53 and 57 can be similar except have only one through hole. In various embodiments, brackets having fewer holes can be smaller, for example, as shown in FIG. 5. FIG. 5 illustrates examples of shapes of different brackets having different numbers of through holes, studs, or both.

In the embodiment illustrated in FIGS. 3-5, support bracket 40 can either be the same or can be an alternate embodiment to support bracket 10 or support bracket 20 shown in FIGS. 1 and 2. In some embodiments, a support bracket can be square with rounded corners, for example. Other embodiments of support brackets are described herein. In various embodiments, the multiple support brackets (e.g., 40 and 50-58 shown in FIGS. 3-5) attach the multiple architectural panels (e.g., 38 and 39) to a support structure (e.g., 45 shown). Further, in a number of embodiments, the multiple first fasteners (e.g., 311, 312, 313, 314, and (e.g., interchangeable) fasteners in support brackets 50-58) attach the multiple support brackets (e.g., 40 and 50-58) to the multiple architectural panels (e.g., 38 and 39). Still further, in various embodiments, the (e.g., identical or interchangeable) multiple second fasteners (e.g., 321) attach the multiple support brackets (e.g., 40 and 50-58) to the support structure (e.g., 45).

In various architectural panel systems (e.g., 30), for example, the multiple support brackets (e.g., 40 and 50-58) each include a plate (e.g., similar or identical to plates 15 and 25 described with reference to FIGS. 1 and 2), for instance, that includes a first side (e.g., similar or identical to 115 or 215), a second side (e.g., similar or identical to 125 or 225), and four quadrants (e.g., similar or identical to 114, 124, 134, and 144 in support bracket 10, 214, 224, 234, and 244 in support bracket 20, or both). Further, in some embodiments, the multiple support brackets (e.g., 40 and 50-58) each include multiple through holes (e.g., similar or identical to 110, 120, 130, and 140 in support bracket 10 and 210, 220, 230, and 240 in support bracket 20), for example, extending through the plate. Still further, in some embodiments, multiple of the four quadrants (e.g., similar to 114, 124, 134, and 144 in support bracket 10, or 214, 224, 234, and 244 in support bracket 20,) each include one of the through holes (e.g., similar or identical to 110, 120, 130, and 140 in support bracket 10 or 210, 220, 230, and 240 in support bracket 20).

Further still, in some embodiments, the multiple support brackets (e.g., 40 and 50-58) each include an (e.g., elongated) plate hole (e.g., 36 shown in FIGS. 3 and 4, which can be similar or identical to elongated plate hole 16 or 26 shown in FIGS. 1 and 2), for example, that extends through the plate of the support bracket, for instance, from the first side (e.g., similar to 115 or 215 shown in FIGS. 1 and 2) to the second side (e.g., similar to 125 or 225). In the embodiment illustrated, for example, the multiple first fasteners (e.g., 311, 312, 313, and 314) extend through the multiple through holes (e.g., similar or identical to 110, 120, 130, and 140 in support bracket 10 or 210, 220, 230, and 240 in support bracket 20), and one of the multiple second fasteners (e.g., 321) extends through the (e.g., elongated) plate hole (e.g., 36) for example, in each of support brackets 40 and 50-58.

In various embodiments (e.g., architectural panel system 30), the multiple architectural panels (e.g., 38 and 39) are each flat (e.g., as shown in FIG. 4), the multiple architectural panels are each polygonal (e.g., rectangular as shown in FIG. 5), or both. Further, in some embodiments, the multiple architectural panels (e.g., 38 and 39) each include multiple interior cutouts (e.g., 59 shown in FIG. 5), for example, through each of the multiple architectural panels (e.g., as shown). Still, further, in a number of embodiments, multiple of the multiple architectural panels (e.g., 38 and 39) are exposed to direct sunlight during at least part of multiple days during a year (e.g., where architectural panel system 30 is installed) such that the direct sunlight passes through multiple of the multiple interior cutouts (e.g., 59) to form a, (e.g., aesthetically pleasing) pattern of sunlight and shade (e.g., similar in shape to interior cutouts 59) in an occupied (e.g., exterior) space (e.g., under panels 38 and 39).

Moreover, some embodiments (e.g., of architectural panel system 30) include the support structure (e.g., 45 shown in FIGS. 3-5). In particular embodiments, for example, the support structure (e.g., 45) includes multiple (e.g., horizontal or substantially horizontal) beams (e.g., 551, 552, 553, 554, and 555 shown in FIG. 5, which, in this particular embodiment, are all part of support structure 45). In some embodiments, for example, the beams are spaced 20 or 24 inches on center, for example. In other embodiments, beams can be spaced 12, 14, 16, 18, 22, 26, 28, 30, 32, 36, 40, 48, or 60 inches on center, as other examples. Further, in certain embodiments, the multiple architectural panels (e.g., 38 and 39) are each attached to two of the multiple (e.g., substantially horizontal) beams with the multiple second fasteners, the multiple support brackets, or both. In some embodiments, more than two such beams are used, as other examples. In the embodiment illustrated in FIG. 5, for example, architectural panels 38 and 39 are each attached to five of the multiple (e.g., substantially horizontal) beams (e.g., 551, 552, 553, 554, and 555 shown in FIG. 5) with multiple second fasteners 321 and multiple support brackets (e.g., 40 and 50-58). In other embodiments, each of the architectural panels may be supported by 2, 3, 4, 6, 7, or 8 (e.g., substantially horizontal) beams, as other examples.

Even further, in various embodiments (e.g., architectural panel system 30), the multiple architectural panels (e.g., 38 and 39 shown in FIG. 4) sit on top of the multiple support brackets (e.g., 40), the multiple support brackets sit on top of the multiple substantially horizontal beams (e.g., 554 shown), or both (e.g., as shown). Further still, in various embodiments, the multiple architectural panels are each supported by at least four, at least six, at least eight, or at least ten of the multiple support brackets, as examples. In FIG. 5, for example, architectural panel 39 is supported by ten (10) of the multiple support brackets, namely, by support brackets 40 and 50-58. Although not all support brackets for architectural panel 38 are shown in FIG. 5, in the embodiment illustrated, architectural panel 38 would be similarly supported by ten (10) support brackets (that include support brackets 40, 50, 51, 52, and 58, which are shown). In other embodiments, architectural panels may be supported by 4, 6, 8, or 12 support brackets, as other examples. The number of support brackets used may depend, for example, on the size and thickness of the architectural panels, among other things.

Still further, in a number of embodiments (e.g., of architectural panel systems), a first plurality of the multiple support brackets each support two of the multiple architectural panels. In the embodiment (e.g., architectural panel system 30) illustrated in FIG. 5, for example, support brackets 40, 50, 51, 52, and 58, each support both (i.e., two) architectural panels 38 and 39. Even further still, in some embodiments, the first plurality of the multiple support brackets (e.g., 40, 50, 51, 52, and 58 shown in FIG. 5) each separate the two of the multiple architectural panels (e.g., 38 and 39) by a predetermined gap (e.g., gap 35 shown in FIG. 3), for example, to allow for expansion and contraction of the two of the multiple architectural panels. In various embodiments, this gap (e.g., 35) or expansion/contraction seam between panels can be, for example, 1/16, 3/32, 1/8, 5/32, 3/16, 7/32, or 1/4 of an inch, as examples.

In some embodiments (e.g., architectural panel system 30), the multiple first fasteners (e.g., 311, 312, 313, and 314 shown in FIGS. 3 and 4) pass through factory-formed panel holes (e.g., 41 and 42 shown in FIG. 4 for first fasteners 311 and 312) through the multiple architectural panels (e.g., 38 and 39). Further, in a number of embodiments, the multiple architectural panels (e.g., 38 and 39) each include an edge cutout (e.g., 385 and 395 shown in FIG. 3 for architectural panels 38 and 39 respectively), for example, for each of the multiple support brackets (e.g., 40 shown in FIGS. 3 and 4, but, in a number of embodiments, similar or identical edge cutouts are provided for other support brackets, for instance, 50-58 shown in FIG. 5, that attach the multiple architectural panels, for example, 38 and 39, to the support structure, for instance, 45). In various embodiments, edge cutouts (e.g., 385 and 395) are part of a circle, for example half of a circle, or almost half of a circle, for instance, as shown. In some embodiments, for example, edge cutouts have a radius of ½ of an inch and the center of curvature that is 0.625 inches beyond the line that forms the edge of the plate. In some embodiments, corners of the edge cutouts are rounded, for example, with a radius of 0.1 inches. Other edge cutouts may differ.

Still further, in particular embodiments, each edge cutout (e.g., 385, 395, or both) provides space for (e.g., one of) the multiple second fasteners (e.g., 321 shown in FIGS. 3 and 4), for example, that attach the multiple support brackets (e.g., 40 shown in FIGS. 3 and 4, but, in a number of embodiments, similar or identical second fasteners are provided for other support brackets, for instance, 50-58 shown in FIG. 5) to the support structure (e.g., 45). In a number of embodiments, the support brackets (e.g., 40) with multiple first fasteners that are spaced a precise distance apart, and panel holes in the architectural panels that precisely located, provide for an even spacing (e.g., gap 35, for example, ⅛-inch apart) of the architectural panels during installation which makes the installation very neat in appearance. Further, in a number of embodiments, edge cutouts (e.g., 385, 395, or both) provide space for installation of the second fasteners (e.g., 321 shown in FIGS. 3 and 4), for example, for the second fasteners themselves, a drive socket to install the second fasteners, or both, for instance, when the architectural panels (e.g., 38 and 39) are already attached to the support bracket (e.g., 40, for instance, with the first fasteners or studs).

Figure 6:
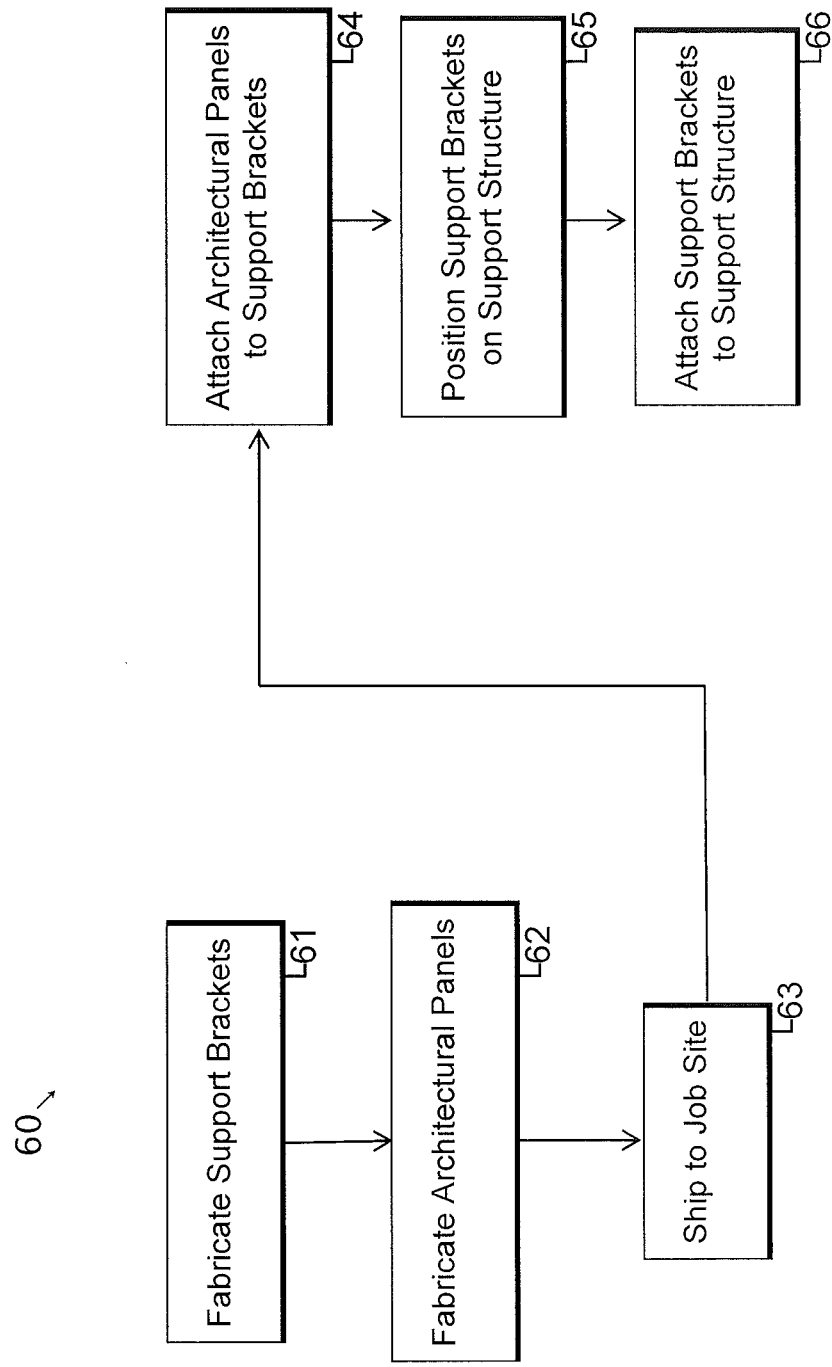
FIG. 6 is a flow chart illustrating an example of a method of installing an architectural system on a support structure.

Still other embodiments include various methods, for example, of installing an architectural panel system on a support structure. FIG. 6, for example, illustrates method 60 of installing an architectural panel system (e.g., 30) on a support structure (e.g., 45). In the embodiment illustrated, method 60 includes, for instance, (e.g., at least) act 64 of attaching (e.g., multiple) architectural panels (e.g., 38 and 39) to (e.g., multiple) support brackets (e.g., 10, 20, 40, or 50-58), act 65 of positioning the (e.g., multiple) support brackets (e.g., on a support structure), and act 66 of attaching the multiple support brackets (e.g., 10, 20, 40, or 50-58) to the support structure (e.g., 45). In a number of embodiments, act 64 includes attaching the multiple architectural panels (e.g., 38 and 39) to the multiple support brackets (e.g., 10, 20, 40, or 50-58) with multiple first fasteners (e.g., 11, 12, 13, and 14; 21, 22, 23, and 24; or 311, 312, 313, and 314, for example, shown in FIGS. 1, 2, and 3, respectively). Further, in various embodiments, the attaching of the multiple support brackets to the support structure (e.g., act 66) is performed with multiple second fasteners (e.g., 321 shown in FIGS. 3 and 4). In a number of embodiments, for example, the multiple second fasteners (e.g., 321) extend through the multiple support brackets (e.g., 10, 20, 40, or 50-58), for instance, through the (e.g., elongated) plate hole (e.g., 16, 26, or 36, shown in FIGS. 1-4).

In particular embodiments, for example, act 64 of attaching the multiple architectural panels (e.g., 38 and 39) to the multiple support brackets (e.g., 10, 20, 40, or 50-58) with the multiple first fasteners (e.g., 11, 12, 13, and 14; 21, 22, 23, and 24; or 311, 312, 313, and 314) is performed before act 65 of positioning the multiple support brackets on the support structure (e.g., 45 shown in FIGS. 4 and 5). In act 65, the contiguous panels can be moved or adjusted in position so that the (e.g., elongated) plate holes (e.g., 16, 26, or 36) all line up as well as possible with the support structure (e.g., 45). Further, in certain embodiments, act 65 of positioning the multiple support brackets (e.g., 10, 20, 40, or 50-58) on the support structure (e.g., 45) is performed before act 66 of attaching the multiple support brackets to the support structure with the multiple second fasteners (e.g., 321). Still further, in some embodiments, act 66 of attaching the multiple architectural panels (e.g., 38 and 39) to the multiple support brackets (e.g., 10, 20, 40, or 50-58) is performed while the multiple support brackets are resting on the support structure (e.g., 45).

Further, in the embodiment shown, method 60 includes act 61 of fabricating the multiple support brackets (e.g., 10, 20, 40, or 50-58), for example, by forming, cutting, or punching the support brackets from a larger plate. In some embodiments, each of the multiple support brackets is fabricated (e.g., in act 61) with (e.g., multiple) first plate holes (e.g., multiple through holes 110, 120, 130, and 140 in support bracket 10; 210, 220, 230, and 240 in support bracket 20; or similar holes described herein for support bracket 40). In a number of embodiments, the first plate holes contain (e.g., installed in act 61) the multiple first fasteners (e.g., multiple studs 11, 12, 13, and 14 in support bracket 10; 21, 22, 23, and 24 in support bracket 20, shown in FIGS. 1 and 2 respectively; or multiple first fasteners 311, 312, 313, and 314 shown in FIGS. 3 and 4 for support bracket 40). In a number of embodiments, these first fasteners are used (e.g., in act 64) to attach the multiple architectural panels (e.g., 38 and 39 shown in FIGS. 3-5) to the multiple support brackets (e.g., 10, 20, 40, or 50-58). Further, in some embodiments, each of the multiple support brackets (e.g., 10, 20, 40, or 50-58) is fabricated (e.g., in act 61) with at least one second plate hole (e.g., plate hole 16, 26, or 36, shown in FIGS. 1-4), for instance, for at least one of the second fasteners (e.g., 321) to attach (e.g., in act 66) each of the multiple support brackets to the support structure (e.g., 45 shown in FIGS. 3-5).

In certain embodiments, different support brackets (e.g., 10 and 20 shown in FIGS. 1 and 2) are fabricated (e.g., in act 61) that can be used with the same architectural panels (e.g., 38 and 39), for example, depending on whether, or how far, it is desirable to have the panels stand off from the support structure. For example, in some embodiments, support brackets 20 are used for vertical mounting on a wall and support brackets 10 are used for horizontal mounting of the panels on horizontal or substantially horizontal beams. In other embodiments, however, support brackets 10 are used for vertical mounting on a wall, support brackets 20 are used for horizontal mounting of the panels on beams, or both, depending on which bracket is best for the particular installation.

Still further, the embodiment of method 60 illustrated in FIG. 6 includes act 62 of fabricating the (e.g., multiple) architectural panels (e.g., 38 and 39 shown in FIGS. 3-5). In a number of embodiments, act 62 includes fabricating the (e.g., multiple) architectural panels (e.g., 38 and 39) (e.g., each) with multiple panel holes (e.g., 41 and 42 shown in FIG. 4 for first fasteners 311 and 312). In various embodiments, the multiple panel holes are formed (e.g., in act 62), for example, spaced in each of the architectural panels (e.g., 38 and 39) for (i.e., to line up with) the multiple first plate holes (e.g., multiple through holes 110, 120, 130, and 140 in support bracket 10; 210, 220, 230, and 240 in support bracket 20 or similar holes described herein for support bracket 40) in the support bracket (e.g., 10, 20, or 40) for the multiple first fasteners (e.g., multiple studs 11, 12, 13, and 14 in support bracket 10; 21, 22, 23, and 24 in support bracket 20, shown in FIGS. 1 and 2 respectively; or multiple first fasteners 311, 312, 313, and 314 shown in FIGS. 3 and 4 for support bracket 40) to attach the multiple architectural panels to the multiple support brackets (e.g., in act 64). In various embodiments, act 62 includes fabricating the (e.g., multiple) architectural panels (e.g., 38 and 39) with the multiple panel holes spaced an equal distance apart as the corresponding multiple first plate holes in the support bracket that attaches to those same panel holes.

Even further, the embodiment shown of method 60 includes act 63 of shipping the multiple architectural panels (e.g., 38 and 39) to a job site or an installation site (i.e., where the architectural panels are attached to the support brackets and installed on the support structure in acts 64-66). In a number of embodiments, act 63 specifically includes shipping the multiple architectural panels (e.g., 38 and 39) to the installation site with the multiple panel holes (e.g., already formed in the architectural panels in act 62). Further, in a number of embodiments, act 63 includes shipping the multiple support brackets (e.g., 10, 20, 40, or 50-58) with the multiple first plate holes (e.g., multiple through holes 110, 120, 130, and 140 in support bracket 10; 210, 220, 230, and 240 in support bracket 20; or similar holes described herein for support bracket 40) to the installation site.

Figure 7:
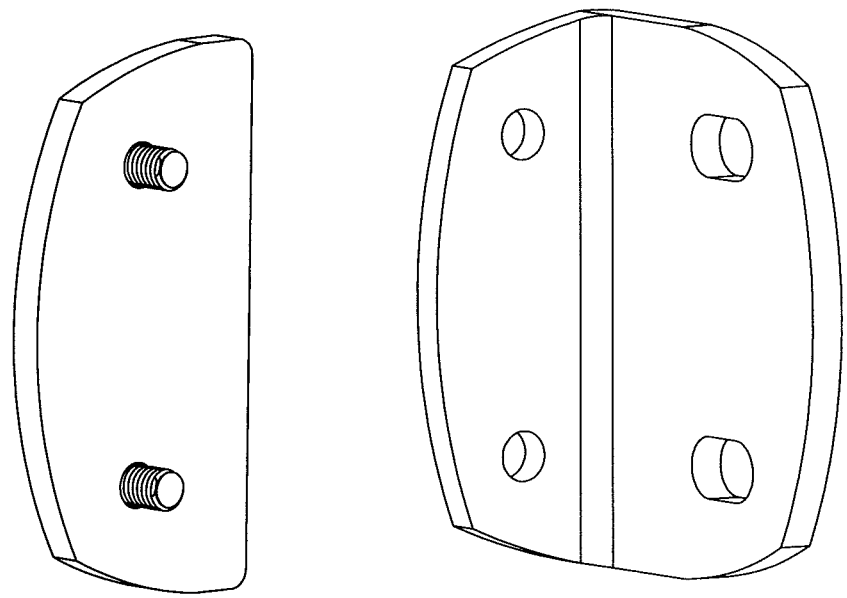
FIG. 7 is an isometric view of an alternative example of a support bracket for supporting panels (e.g., architectural panels) that is a two-piece bracket shown with the two pieces separated.
Figure 8:
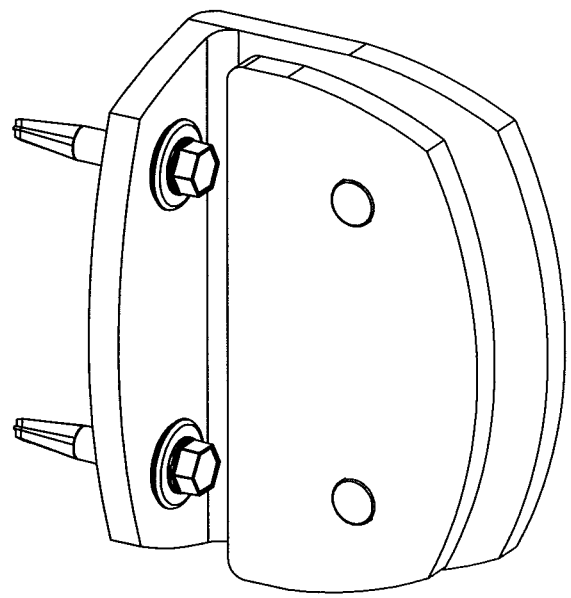
FIG. 8 is an isometric view of the two-piece bracket of FIG. 7 shown with the two pieces assembled.

FIGS. 7 and 8 illustrate an alternative embodiment of a support bracket for supporting panels (e.g., architectural panels) that is a two-piece bracket, for instance, made of ³⁄₁₆-inch thick (e.g., metal) plate. In a number of embodiments, multiple such brackets (e.g., 4) can be used to support one panel. In the embodiment illustrated in FIG. 7, the right hand piece of the bracket is an angle bracket (e.g., a right angle) with two flat portions separated by a bend or corner. Each flat portion, in this embodiment, has two through holes. The two elongated through holes on the left in FIG. 7, in the embodiment represented, are used to connect to (e.g., factory formed) holes in the panels with two fasteners. In the embodiment shown, these two fasteners are the studs (e.g., ¼-inch self-clinching studs) shown installed in the flat left hand piece shown in FIG. 7. These two studs, for example, can be similar or identical to the previously described, multiple first fasteners or studs (e.g., 11, 12, 13, and 14 in support bracket 10 and 21, 22, 23, and 24 in support bracket 20 in FIGS. 1 and 2 or 31, 312, 312, and 314 shown in FIGS. 3 and 4).

In this embodiment, the panel (not shown in FIGS. 7 and 8) is clamped between the two pieces of the bracket (e.g., when the two pieces are oriented as shown in FIG. 8) and the two pieces of the bracket and the panel are held together by the two studs and corresponding nuts. Such nuts are not shown in FIGS. 7 and 8, but can be similar or identical to nuts shown on fasteners 311, 312, 313, and 314 in FIGS. 3 and 4, for example. In various embodiments, self-locking nuts are used. The elongated holes in the right hand piece shown in FIG. 7 provide for minor adjustment during installation and can provide for expansion and contraction of the panel once installed. In the embodiment depicted, the two screws shown in FIG. 8 can be similar or identical to the multiple second fasteners previously described (e.g., screws, for instance, 321 shown in FIGS. 3 and 4 for support bracket 40) and can attach the two piece bracket to the support structure. In a number of embodiments, the two-piece brackets shown in FIGS. 7 and 8 can be used for installations where the panels (e.g., architectural panels 38 or 39 shown in FIG. 5) are installed vertically, for example, as barriers separating adjacent occupied spaces or as barriers defining occupied spaces. In a number of such embodiments, the two-piece brackets connect the panels to vertical support structure columns located between the panels.

In various embodiments, the two piece brackets shown in FIGS. 7 and 8 are connected with the studs and nuts to a panel, and then the panel is positioned vertically between two previously installed vertical columns of the support structure. In some embodiments, once the panel and brackets are positioned, the (e.g., second) fasteners shown in FIG. 8 are installed attaching the brackets to the columns of the support structure. In a number of embodiments, these second fasteners are self-drilling fasteners and are installed with a power driver (e.g., a power drill). In some embodiments, the nuts on the studs (e.g., shown in FIG. 7 or first fasteners) are not fully tightened until the two-piece brackets are secured with the second fasteners to the support structure. This allows the studs to move in the elongated holes more easily, if necessary, while the second fasteners are tightened, and can avoid unnecessary stress on other second fasteners through other brackets that have already been installed.

Various embodiments of the subject matter described herein include various combinations of the acts, structure, components, and features described herein, shown in the drawings, described in any documents that are incorporated by reference herein, or that are known in the art. Moreover, certain procedures can include acts such as manufacturing, obtaining, or providing components that perform functions described herein or in the documents that are incorporated by reference. The subject matter described herein also includes various means for accomplishing the various functions or acts described herein, in the documents that are incorporated by reference, or that are apparent from the structure and acts described. Each function described herein is also contemplated as a means for accomplishing that function, or where appropriate, as a step for accomplishing that function. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A support bracket for supporting panels, the support bracket comprising:
   a first side;
   a second side opposite the first side;
   a center;
   multiple through holes extending through the support bracket;
   multiple self-clinching studs, wherein one of the multiple self-clinching studs is mounted in each of the multiple through holes, and each of the multiple self-clinching studs extends from the first side of the support bracket; and
   a center hole that extends through the support bracket at the center of the support bracket.

2. The support bracket of claim 1 wherein the multiple self-clinching studs are each parallel to one another.

3. The support bracket of claim 1 wherein the center hole is elongated.

4. The support bracket of claim 1 wherein the multiple self-clinching studs do not extend from the second side of the support bracket.

5. The support bracket of claim 1 wherein the multiple self-clinching studs are flush with the second side of the support bracket.

6. The support bracket of claim 1 wherein the multiple self-clinching studs are arranged in a circle.

7. The support bracket of claim 6 wherein the circle has a circle center at the center of the support bracket.

8. The support bracket of claim 6 wherein the multiple self-clinching studs are equally spaced around the circle.

9. The support bracket of claim 1 wherein the multiple self-clinching studs are arranged in a rectangle with the multiple through holes at corners of the rectangle.

10. The support bracket of claim 1 comprising:
    four of the through holes extending through the support bracket; and
    four of the self-clinching studs, wherein one of the self-clinching studs is mounted in each of the four through holes.

11. A support bracket for supporting panels, the support bracket comprising:
    a first side;
    a second side opposite the first side;
    a center;
    multiple through holes extending through the support bracket;
    multiple studs, wherein one of the multiple studs is mounted in, each of the multiple through holes, each of the multiple studs extends from the first side of the support bracket, and the multiple studs do not extend from the second side of the support bracket; and
    a center hole that extends through the support bracket at the center of the support bracket.

12. The support bracket of claim 11 wherein the multiple studs are each parallel to one another.

13. The support bracket of claim 11 wherein the center hole is elongated.

14. The support bracket of claim 11 having four of the through holes wherein the through holes are arranged in a square with the through holes at corners of the square.

15. The support bracket of claim 11 wherein the support bracket comprises four quadrants; each of the four quadrants comprises a corner; the support bracket comprises four edges; each of the four edges extends into two of the four quadrants; and each of the four quadrants includes one of the multiple through holes and one of the multiple studs.

16. The support bracket of claim 11 wherein the multiple studs are self-clinching studs.

17. The support bracket of claim 11 wherein the multiple studs are arranged in a rectangle with the multiple through holes at corners of the rectangle.

18. A support bracket for supporting architectural panels, the support bracket comprising:
    a plate;
    four through holes extending through the plate, wherein:
      the four through holes are arranged in a circle; and
      the four through holes are equally spaced around the circle;
    four studs, wherein one of the four studs is mounted in each of the four through holes, and each of the four studs extends from the plate; and
    a center hole that extends through the plate at a center of the plate.

19. The support bracket of claim 18 wherein the four studs are self-clinching studs.

20. The support bracket of claim 18 wherein each of the four studs extends from a first side of the plate, and the four studs do not extend from a second side of the plate that is opposite the first side of the plate.

* * * * *